(12) United States Patent
Saito et al.

(10) Patent No.: US 9,702,688 B2
(45) Date of Patent: Jul. 11, 2017

(54) SHAPE MEASURING APPARATUS

(71) Applicant: MITUTOYO CORPORATION, Kanagawa (JP)

(72) Inventors: Osamu Saito, Kanagawa (JP); Ichiro Taniguchi, Kanagawa (JP)

(73) Assignee: MITUTOYO CORPORATION, Kanagawa (JP)

( * ) Notice: Subject to any disclaimer, the term of this patent is extended or adjusted under 35 U.S.C. 154(b) by 0 days.

(21) Appl. No.: 14/217,704

(22) Filed: Mar. 18, 2014

(65) Prior Publication Data

US 2014/0268177 A1  Sep. 18, 2014

(30) Foreign Application Priority Data

Mar. 18, 2013  (JP) .................................. 2013-054535

(51) Int. Cl.
*G01B 11/24*  (2006.01)
*G01B 11/00*  (2006.01)
*G01B 11/25*  (2006.01)

(52) U.S. Cl.
CPC .......... *G01B 11/00* (2013.01); *G01B 11/2518* (2013.01)

(58) Field of Classification Search
CPC ..... G01B 11/2513; G01B 11/24; G01B 11/25; G01B 11/2518; G01B 11/2545
USPC .................................................. 356/601–623
See application file for complete search history.

(56) References Cited

U.S. PATENT DOCUMENTS

| | | | | |
|---|---|---|---|---|
| 4,762,412 A | * | 8/1988 | Ohkubo et al. ............... | 356/319 |
| 5,369,490 A | * | 11/1994 | Kawai .................... | G01B 11/24 356/601 |
| 5,461,478 A | * | 10/1995 | Sakakibara et al. .......... | 356/623 |
| 6,909,513 B1 | * | 6/2005 | Fujita et al. ................... | 356/601 |
| 7,061,628 B2 | * | 6/2006 | Franke et al. ................. | 356/604 |
| 7,715,020 B2 | * | 5/2010 | Yamaguchi ........ | G01B 11/2518 356/601 |
| 8,699,036 B2 | * | 4/2014 | Ditte .................... | G01C 15/002 356/141.5 |
| 2002/0171847 A1 | * | 11/2002 | Fukumoto .......... | G01B 11/2518 356/606 |
| 2003/0090646 A1 | * | 5/2003 | Riegl ................... | G01C 15/002 356/3 |

(Continued)

FOREIGN PATENT DOCUMENTS

JP      4-181107 A      6/1992
JP   2005-233748 A     9/2005

(Continued)

OTHER PUBLICATIONS

U.S. Appl. No. 14/197,715 to Masaoki Yamagata et al., filed Mar. 5, 2014.

(Continued)

*Primary Examiner* — Hoa Pham (74) *Attorney, Agent, or Firm* — Greenblum & Bernstein, P.L.C.

(57) ABSTRACT

A shape measuring apparatus includes: an irradiating part configured to irradiate work with a linear line laser, the irradiating part including: a light source configured to produce light; and an optical element configured to linearly spread the light from the light source and generate the line laser, the optical element being constructed rotatably around an optical axis of the line laser; and an imaging part configured to image the line laser reflected by the work.

6 Claims, 10 Drawing Sheets

(56) References Cited

U.S. PATENT DOCUMENTS

| | | | |
|---|---|---|---|
| 2004/0080758 A1* | 4/2004 | Ban | G06T 7/0044 356/603 |
| 2004/0150837 A1* | 8/2004 | Sugiyama | 356/603 |
| 2009/0040533 A1* | 2/2009 | Takahashi | G01B 11/2522 356/612 |
| 2010/0134596 A1* | 6/2010 | Becker | G01C 15/002 348/47 |
| 2011/0141488 A1* | 6/2011 | Schumacher | G01C 15/004 356/614 |
| 2012/0105867 A1* | 5/2012 | Komatsu | 356/610 |
| 2012/0262724 A1 | 10/2012 | Nemoto et al. | |
| 2015/0043008 A1* | 2/2015 | Blanckaert | G01B 11/0608 356/608 |
| 2015/0077761 A1* | 3/2015 | Yamagata | G01B 11/005 356/601 |

FOREIGN PATENT DOCUMENTS

| | | |
|---|---|---|
| JP | 2009-534969 | 9/2009 |
| JP | 2011-110675 | 6/2011 |
| JP | 2012-225701 A | 11/2012 |
| WO | 2007/125081 | 11/2007 |

OTHER PUBLICATIONS

Office Action issued in Japanese family member Patent Appl. No. 2013-054535, dated Nov. 1, 2016, along with an English translation thereof.

* cited by examiner

SHAPE MEASURING APPARATUS

CROSS-REFERENCE TO RELATED APPLICATION(S)

This application is based upon and claims the benefit of priority from Japanese Patent Application No. 2013-054535, filed on Mar. 18, 2013, the entire contents of which are incorporated herein by reference.

BACKGROUND

1. Field of the Invention

The present invention relates to a shape measuring apparatus for measuring a shape of an object to be measured by irradiating the object to be measured with light and imaging the object to be measured.

2. Description of the Related Art

Conventionally, a shape measuring apparatus for measuring a surface shape of work by scanning a surface of the work by a probe and capturing position coordinates etc. of each part of the work is known.

Such a known shape measuring apparatus is a non-contact apparatus for making measurement without bringing a probe into contact with a surface of work as described in JP-T-2009-534969.

In the non-contact surface shape measuring apparatus described in JP-T-2009-534969, a surface shape of work is measured by irradiating a surface of the work with a linear line laser by a scanning probe and imaging this surface from a predetermined angle with respect to a direction of irradiation with the line laser. According to such a non-contact surface shape measuring apparatus, there is no fear of damaging the surface of the work and also considering an influence on measurement accuracy due to abrasion of the probe.

Also, it is necessary to rotate the line laser according to the shape of the work in the shape measuring apparatus described above. In this case, in JP-A-2011-110675, the whole scanning probe is rotated to thereby rotate the line laser. However, since the whole scanning probe is rotated, a measurement speed decreases.

SUMMARY

An object of the invention is to provide a shape measuring apparatus for improving a measurement speed.

A shape measuring apparatus according to the invention has an irradiating part and an imaging part. The irradiating part irradiates work with a linear line laser. The imaging part images the line laser reflected by the work. The irradiating part has a light source and an optical element.

The optical element linearly spreads light from the light source and generates the line laser. The optical element is constructed rotatably around an optical axis of the line laser.

According to this invention, a shape measuring apparatus for improving a measurement speed can be provided.

BRIEF DESCRIPTION OF THE DRAWINGS

The present invention will become more fully understood from the detailed description given hereinbelow and the accompanying drawing which is given by way of illustration only, and thus is not limitative of the present invention and wherein.

DETAILED DESCRIPTION OF THE INVENTION

Figure 1:
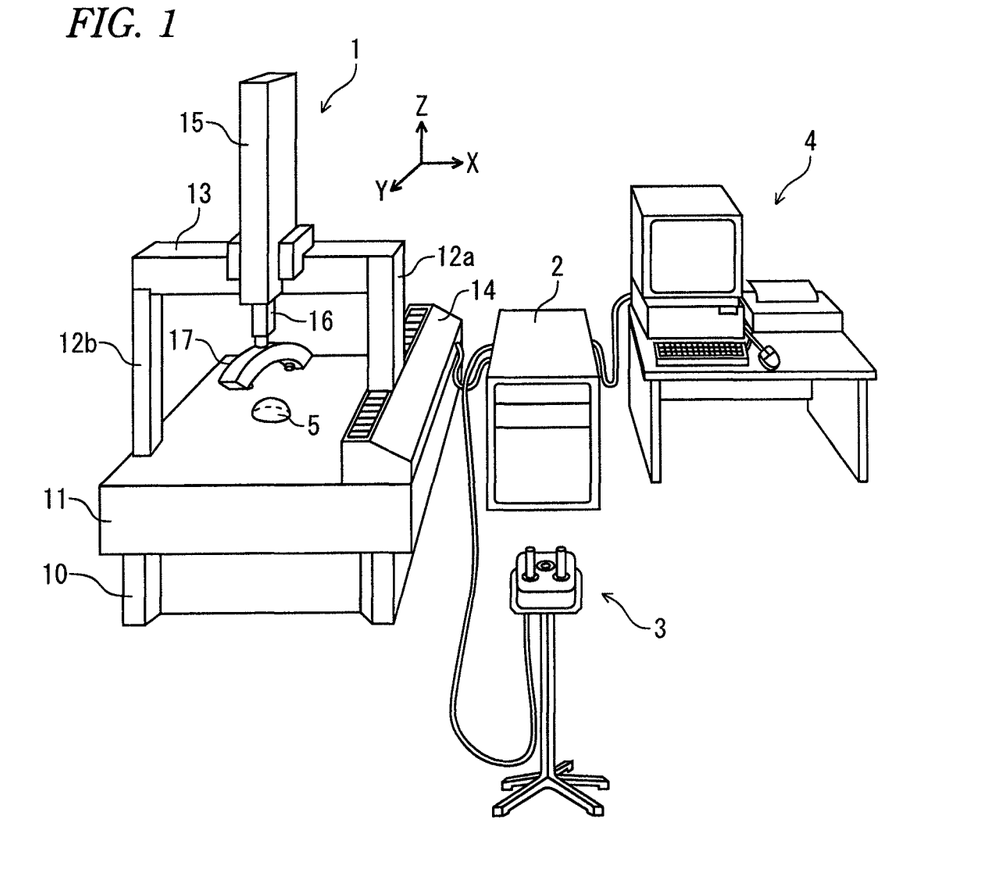
FIG. 1 is the overall diagram of a system constructing a shape measuring apparatus according to a first embodiment of the invention.

A shape measuring apparatus according to an embodiment of the invention will be described in detail with reference to the drawings. FIG. 1 is the overall diagram of a system constructing the shape measuring apparatus according to the embodiment. This shape measuring apparatus is constructed by attaching an optical probe 17 according to the present embodiment as a measurement probe of a coordinate measuring machine 1 as shown in FIG. 1. This shape measuring apparatus includes a motion controller 2, an operation panel 3, and a host system 4. The motion controller 2 drives and controls the coordinate measuring machine 1 and also, captures a necessary measured coordinate value from this coordinate measuring machine 1. The operation panel 3 manually operates this coordinate measuring machine 1 through this motion controller 2. The host system 4 edits and executes a part program for instructing a measurement procedure in the motion controller 2. Also, the host system 4 has a function of doing calculation for fitting a geometric shape to the measured coordinate value captured through the motion controller 2, or recording or sending the part program.

The coordinate measuring machine 1 is constructed as described below. That is, a surface plate 11 is placed on an anti-vibration table 10 so that an upper surface of the surface plate 11 matches with a horizontal plane as a base surface, and an X-axis guide 13 is supported on the upper ends of arm support bodies 12a, 12b erected from both side ends of this surface plate 11. The lower end of the arm support body 12a is driven in a Y-axis direction by a Y-axis driving mechanism 14, and the lower end of the arm support body 12b is supported on the surface plate 11 movably in the Y-axis direction by air bearings. The X-axis guide 13 drives a Z-axis guide 15 extending vertically in an X-axis direction. The Z-axis guide 15 is provided with a Z-axis arm 16 so as to be driven along the Z-axis guide 15, and the non-contact optical probe 17 is attached to the lower end of the Z-axis arm 16. In addition, the optical probe 17 may be rotatable in a horizontal plane or a vertical plane.

Figure 2:
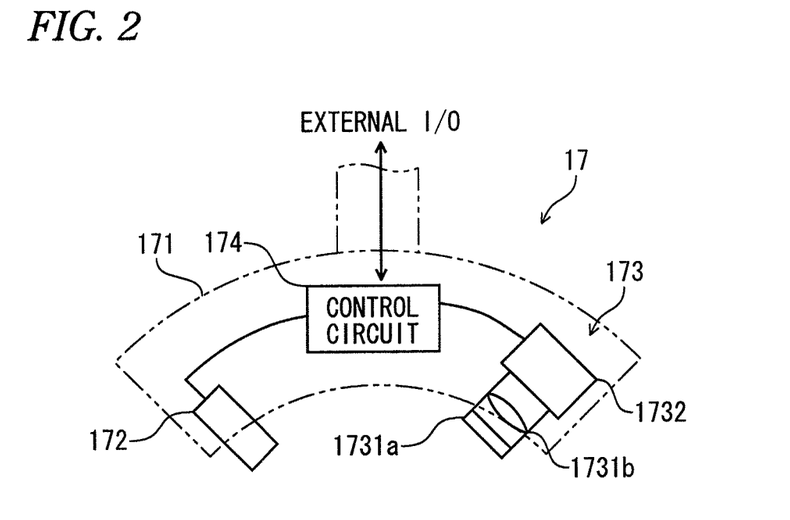
FIG. 2 is a diagram showing a configuration of an optical probe 17 according to the embodiment.

FIG. 2 shows a configuration of the optical probe 17 according to the present embodiment. The optical probe 17 has a chassis 171, a laser light generating part 172 arranged inside the chassis 171, an imaging device 173 for imaging work, and a control circuit 174 for adjusting the laser light generating part 172 as shown in FIG. 2. In addition, a detailed configuration of the laser light generating part 172 and control of the configuration will be described below.

The laser light generating part 172 irradiates work 5 with a linear line laser extending in a direction orthogonal to a plane formed by the optical axis (the optical axis in the center of a scanning direction) of the laser light generating part 172 and the optical axis of the imaging device 173, and linearly illuminates a surface of the work 5.

The imaging device 173 has a band-pass filter 1731a, a lens 1731b, and a CMOS sensor 1732 for imaging an image of the work 5 through the band-pass filter and the lens. The imaging device 173 is arranged in a direction of receiving light from a direction of forming a predetermined angle with respect to a direction of irradiating the work 5 with light from a light source. That is, the surface of the work 5 is irradiated with the line laser, and light reflected along a shape of the surface of the work 5 is received from a predetermined angle by the imaging device 173.

Figure 3A:
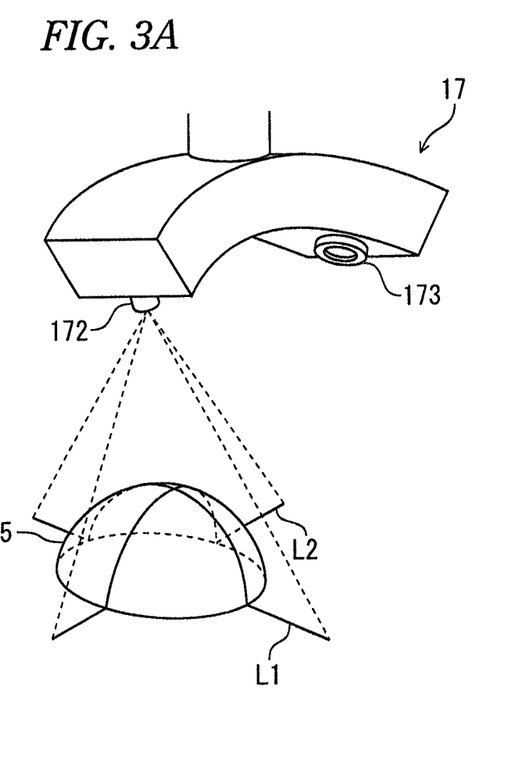
FIGS. 3A and 3B are schematic diagrams showing a line laser applied using the optical probe 17.
Figure 3B:
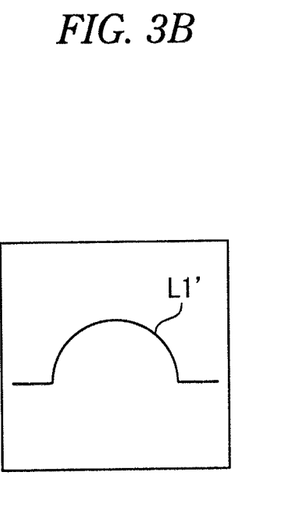

FIGS. 3A and 3B are schematic diagrams showing a line laser applied using the optical probe 17. As shown in FIG. 3A, when the work 5 is irradiated with a linear line laser L1 by the laser light generating part 172, reflected light L1' of the line laser is deformed along the surface of the work 5, and a contour at the time of cutting the work 5 in a certain plane is sectioned by the reflected light L'. The imaging device 173 images the work 5 at a predetermined angle from a direction of irradiation with laser light of the laser light generating part 172, and images an image of the reflected light L1' as shown in FIG. 3B.

Further, in the present embodiment, the laser light generating part 172 can rotate the line laser L1 around the optical axis and generate a line laser L2 as shown in FIG. 3B.

Figure 4:
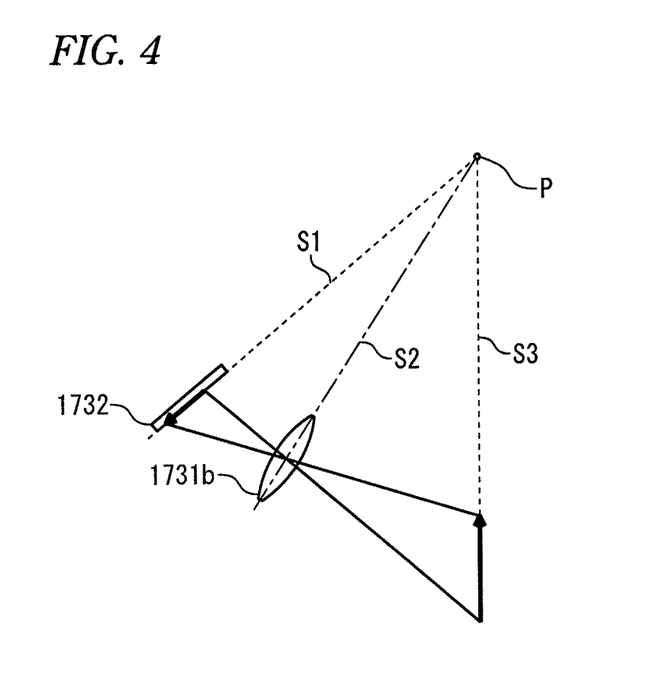
FIG. 4 is a schematic diagram showing arrangement of the inside of the optical probe 17.

FIG. 4 is a schematic diagram showing arrangement of the inside of the optical probe 17. In addition, the band-pass filter 1731a is omitted in FIG. 4. The optical probe 17 according to the present embodiment uses the Scheimpflug principle and as shown in FIG. 4, surfaces S1 to S3 respectively extending an imaging surface of the CMOS sensor 1732, a principal plane including a principal point of the lens 1731b, and a surface of irradiation with the line laser with which the work 5 is irradiated intersect at one point P. By such arrangement, focus is achieved on the whole imaging surface of the CMOS sensor 1732.

Figure 5A:
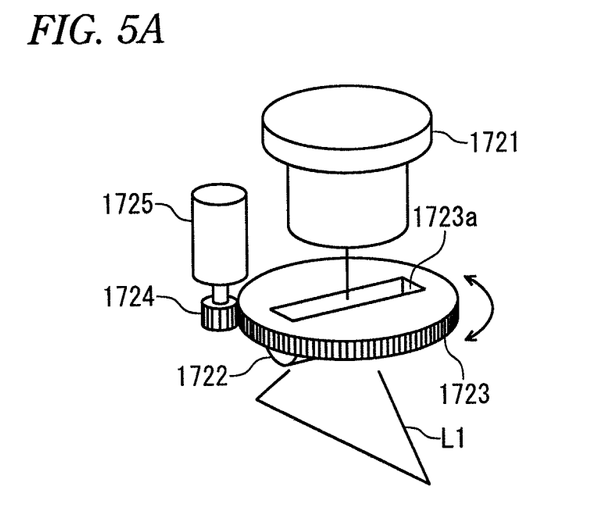
FIG. 5A is a schematic diagram showing a laser light generating part 172 according to the embodiment.

FIG. 5A is a schematic diagram showing the laser light generating part 172 according to the present embodiment. The laser light generating part 172 has a light source 1721 for applying laser light, and a rod lens 1722 for spreading the laser light and generating a line laser as shown in FIG. 5A. The rod lens 1722 is fitted into the lower portion of an opening 1723a of a gear 1723. The gear 1723 meshes with a gear 1724, and the center of the gear 1724 is bonded to a rotating shaft of a motor 1725. As shown in FIG. 5A, the laser light from the light source 1721 is applied to the rod lens 1722 through the opening 1723a of the gear 1723, and a line laser L1 is generated.

Figure 5B:
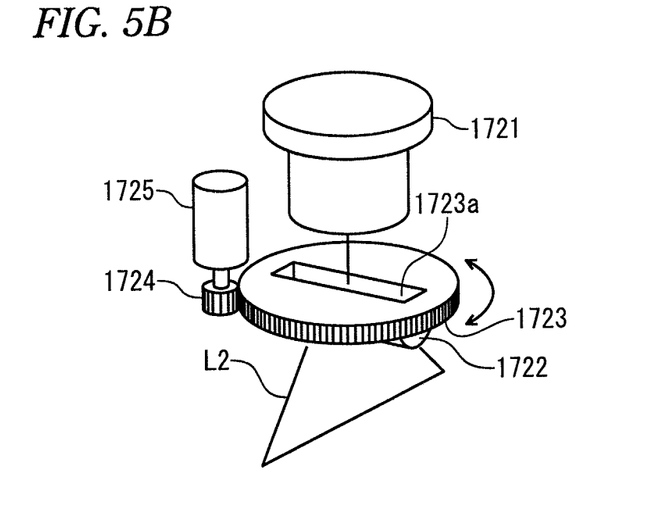
FIG. 5B is a schematic diagram showing another state of the laser light generating part 172 according to the embodiment.

FIG. 5B is a schematic diagram showing another state of the laser light generating part 172. As shown in FIG. 5B, the motor 1725 rotates the rod lens 1722 around the optical axis of the laser light through the gears 1724, 1723. With this, the line laser L1 is rotated to generate a line laser L2 as shown in FIG. 5B.

Figure 6:
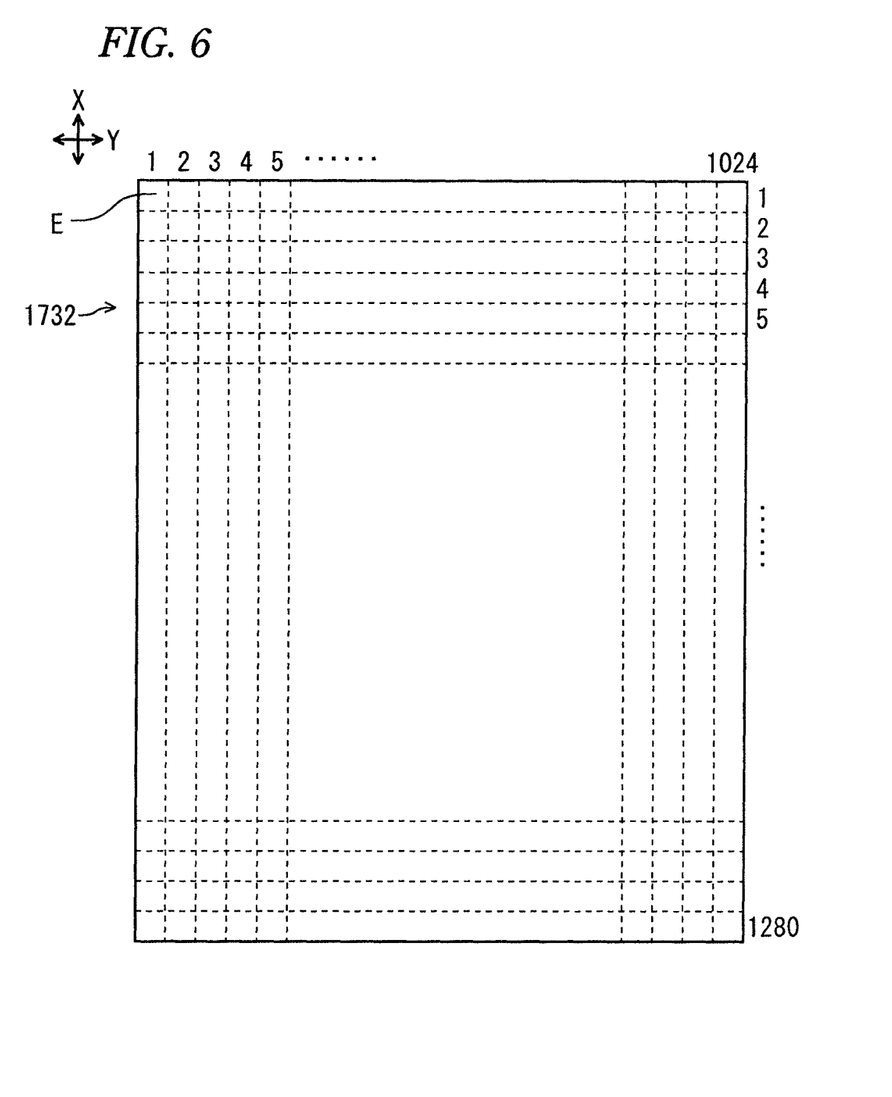
FIG. 6 is a pattern diagram showing a CMOS sensor 1732 according to the embodiment.

FIG. 6 is a pattern diagram showing the CMOS sensor 1732 according to the present embodiment. The CMOS sensor 1732 has 2D array of pixel sensors in X and Y directions as shown in FIG. 6. For example, in the present embodiment, the CMOS sensor 1732 has 1024 light receiving elements E in a direction of extension of the linear line laser and 1280 light receiving elements E in a direction orthogonal to this direction of extension.

Also, the CMOS sensor 1732 has an electronic shutter (rolling shutter). When the electronic shutter is driven continuously without stopping rotation of the line laser, many images can be acquired in a short time. Consequently, time of shape measurement can be shortened. Also, an increase in shutter speed of the electronic shutter can prevent degradation in measurement accuracy due to image blurring based on rotation of the line laser. In addition, in order to acquire an image capable of calculating a shape of the work 5, the shutter speed could be controlled in the range capable of ensuring the necessary amount of light.

Figure 7:
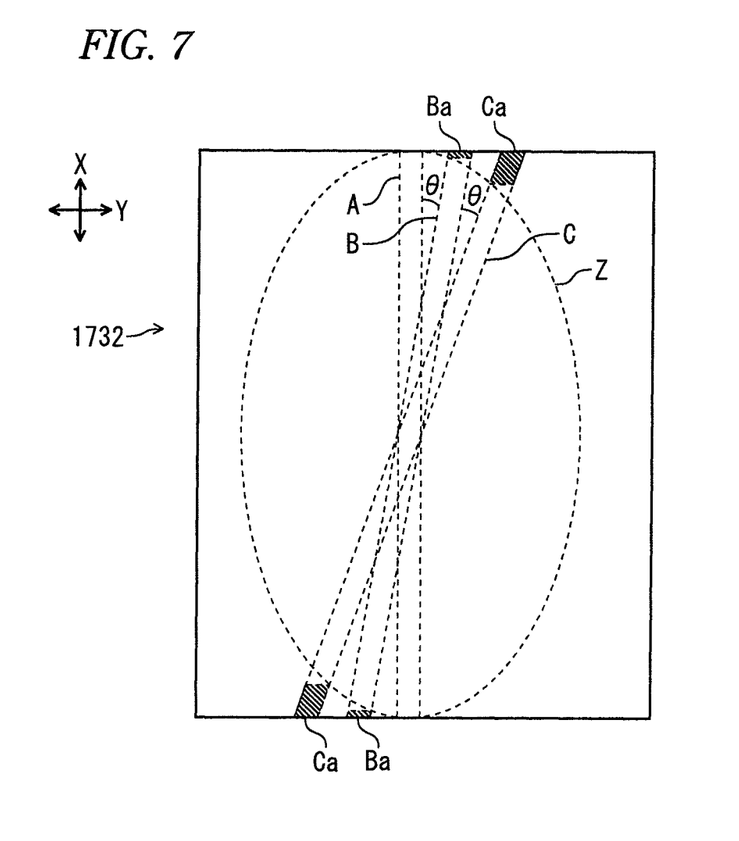
FIG. 7 is a pattern diagram showing the CMOS sensor 1732 according to the embodiment.

For example, in the CMOS sensor 1732, the light receiving elements arranged in one column in a region A in substantially the center of the Y direction first receive light simultaneously as shown in FIG. 7. Subsequently, the line laser is rotated by an angle θ. Then, the light receiving elements arranged in a region B in which the region A is rotated by the angle θ receive light simultaneously. Thereafter, the line laser is similarly rotated by the angle θ, and the light receiving elements arranged in a region C in which the region B is rotated by the angle θ receive light simultaneously. However, in such measurement, a misalignment of focal point on the CMOS sensor 1732 increases with rotation of the rod lens 1722. For example, the focal point is shifted in the light receiving elements in regions Ba of both ends of the region B, and the focal point is shifted in the light receiving elements in regions Ca of both ends of the region C. Then, the region Ca becomes larger than the region Ba. Hence, as shown in FIG. 7, in the present embodiment, the control circuit 174 eliminates light received by the light receiving elements arranged in the regions other than an elliptic region Z on the CMOS sensor 1732, and computes a shape of the work 5, and reduces an influence of the misalignment of focal point.

Figure 8:
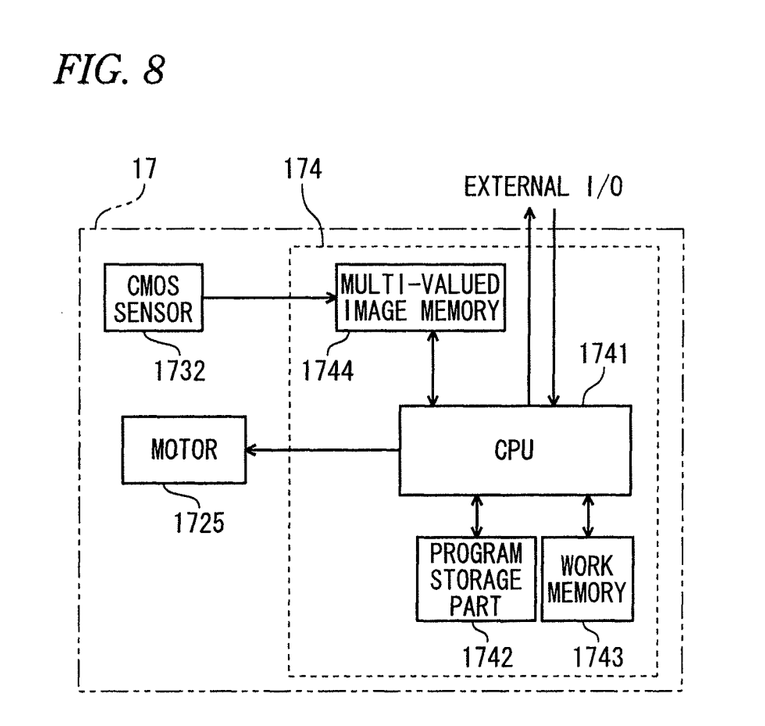
FIG. 8 is a block diagram representing a control system of the optical probe 17.

FIG. 8 is a block diagram representing a control system of the optical probe 17 according to the present embodiment. The control circuit 174 has a CPU 1741, a program storage part 1742 connected to the CPU 1741, a work memory 1743, and a multi-valued image memory 1744 as shown in FIG. 8. Image information acquired in the CMOS sensor 1732 is inputted to the CPU 1741 through the multi-valued image memory 1744. The CPU 1741 controls a driving state of the motor 1725.

Figure 9:
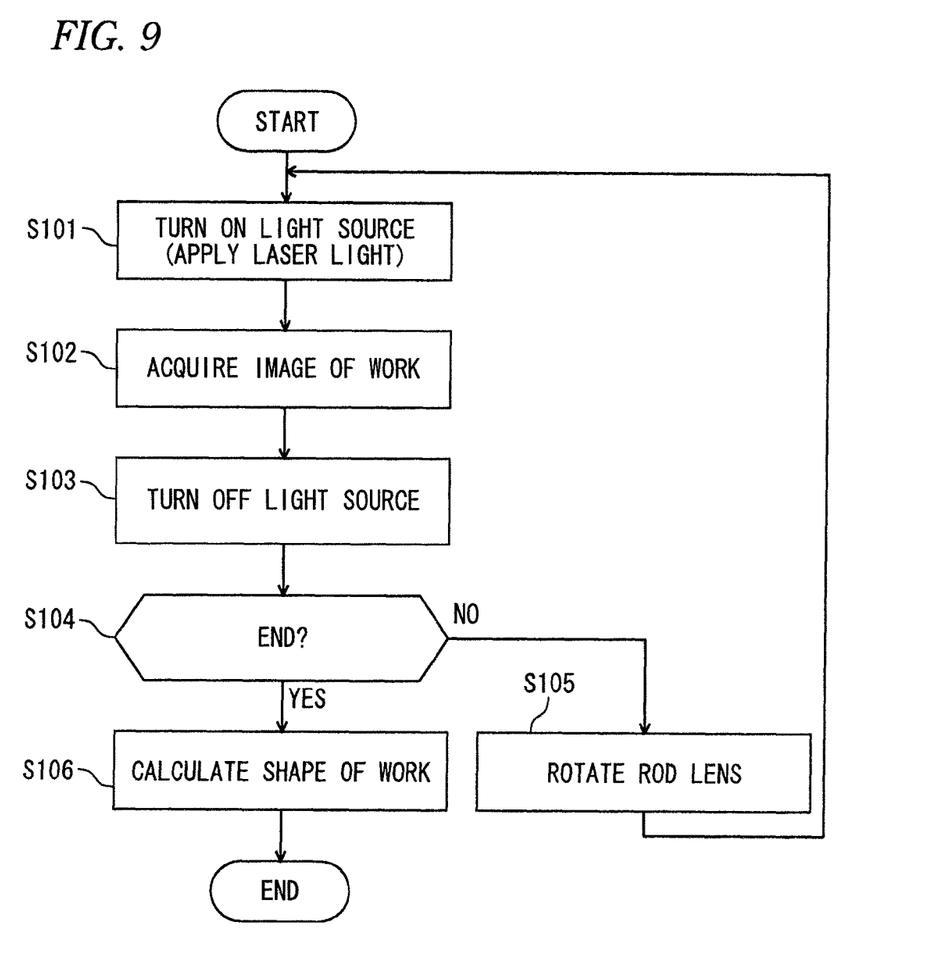
FIG. 9 is a flowchart showing operation of the shape measuring apparatus according to the embodiment.

Next, operation of the shape measuring apparatus according to the embodiment will be described with reference to FIG. 9. FIG. 9 is a flowchart showing the operation of the shape measuring apparatus. As shown in FIG. 9, the control circuit 174 first activates (turns on) the light source 1721 (S101). Accordingly, the work 5 is irradiated with a line laser. Next, the control circuit 174 acquires an image of the work 5 by the CMOS sensor 1732 (S102). Subsequently, the control circuit 174 deactivates (turns off) the light source 1721 (S103).

Subsequently, the control circuit 174 determines whether or not an end command is accepted (S104). When the end command is not accepted (S104, No), the control circuit 174 rotates the rod lens 1722 by a predetermined angle (S105), and again executes processing of step S101. On the other hand, when the end command is accepted (S104, Yes), the control circuit 174 calculates a shape of the work 5 based on the acquired image of the work 5 (S106).

In the present embodiment described above, the rod lens 1722 rotates around the optical axis of the line laser as shown in FIGS. 5A and 5B. With this, the line laser also rotates as shown in FIGS. 3A and 3B. Consequently, the present embodiment can measure the end of the work 5 with a lens shape without moving the optical probe 17. That is, the present embodiment can improve a measurement speed as compared with the case of rotating the whole optical probe 17.

[Other Embodiment]

One embodiment of the shape measuring apparatus according to the invention has been described above, but the invention is not limited to the embodiment described above, and various changes, additions, replacements, etc. can be made without departing from the gist of the invention. For example, a cylindrical lens may be formed instead of the rod lens 1722.

Figure 10:
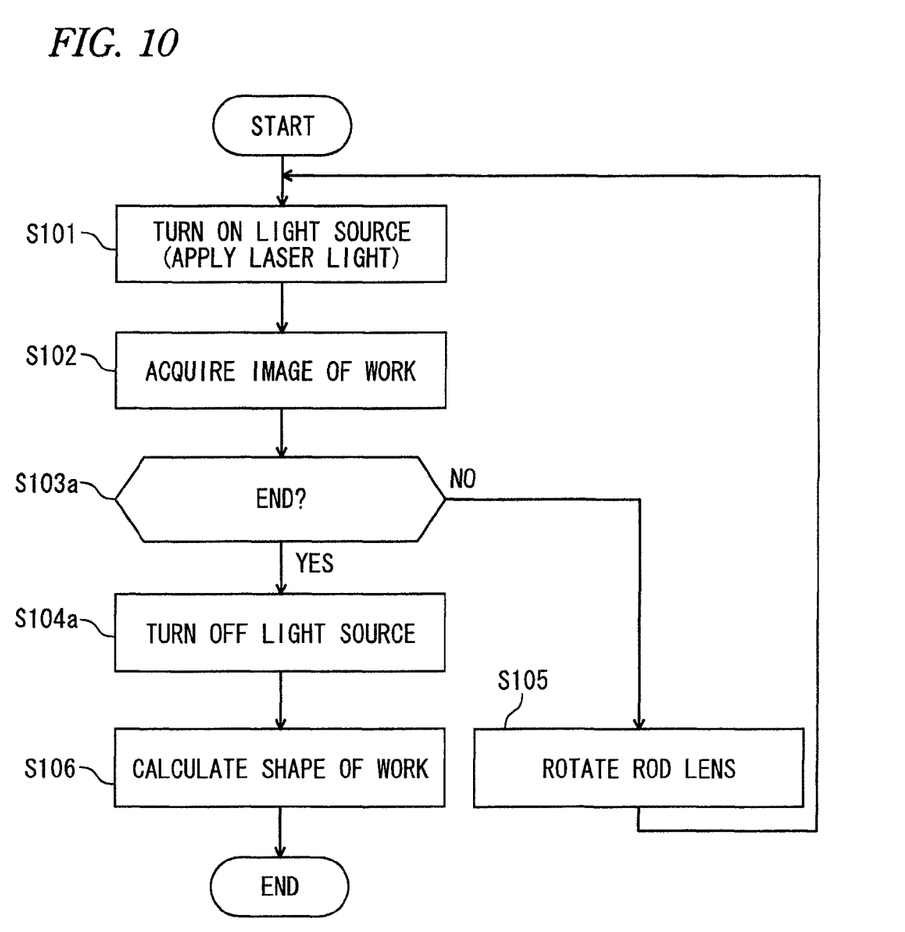
FIG. 10 is a flowchart showing operation of a shape measuring apparatus according to another embodiment.

Also, as shown in FIG. 10, the control circuit 174 may determine whether or not an end command is accepted after step S102 (S103a). When the end command is not accepted herein (S103a, No), the control circuit 174 rotates the rod lens 1722 by a predetermined angle (S105), and again executes processing of step S102. On the other hand, when the end command is accepted (S103a, Yes), the control circuit 174 deactivates (turns off) the light source 1721 (S104a) and thereafter, executes step S106. In addition, in FIGS. 9 and 10, a shape of the work 5 is calculated after all the images of the work 5 are acquired by way of example. However, the shape of the work 5 may be calculated after images of respective works 5 are acquired.

What is claimed is:

1. A shape measuring apparatus comprising:
   an irradiating part configured to directly irradiate a work with a linear line laser, the irradiating part including:
      a light source configured to produce light; and
      an optical element configured to linearly spread the light from the light source and generate the line laser, the optical element being constructed rotatably around an optical axis of the line laser;
   an imaging sensor configured to image the line laser reflected by the work;
   plural light receiving elements, arranged two-dimensionally in the imaging part, configured to receive a line laser reflected by the work and image an image of the work; and
   a control circuit configured to reduce an influence of a misalignment of a focal point of the light on the imaging part, by eliminating light received by the light receiving elements arranged in regions other than an elliptic region, and compute a shape of the work in the case of rotating the optical element.

2. The shape measuring apparatus according to claim 1, wherein the optical element is a rod lens or a cylindrical lens.

3. The shape measuring apparatus according to claim 1, wherein the optical element is configured to rotate 360 degrees about the optical axis of the line laser.

4. A shape measuring apparatus comprising:
   an irradiator configured to directly irradiate a work with a linear line laser, the irradiator including:
      a light source configured to produce light; and
      an optical element configured to linearly spread the light from the light source and generate the line laser, the optical element rotatably positioned around an optical axis of the line laser;
   an imager configured to image the line laser reflected by the work;
   a probe on which the irradiator and imager are mounted, wherein the probe is configured to move the irradiator and imager together;
   a plurality of light receiving elements arranged two-dimensionally in the imager and configured to receive a line laser reflected by the work and further configured to image an image of the work; and
   a controller configured to reduce an influence of a misalignment of a focal point of the light on the imager, by eliminating light received by the plurality of light receiving elements arranged in regions other than an elliptic region, and further configured to compute a shape of the work in the case of rotating the optical element.

5. The shape measuring apparatus according to claim 4, wherein the optical element is one of a rod lens and a cylindrical lens.

6. The shape measuring apparatus according to claim 4, wherein the optical element is configured to rotate 360 degrees about the optical axis of the line laser.

* * * * *